UNITED STATES PATENT OFFICE.

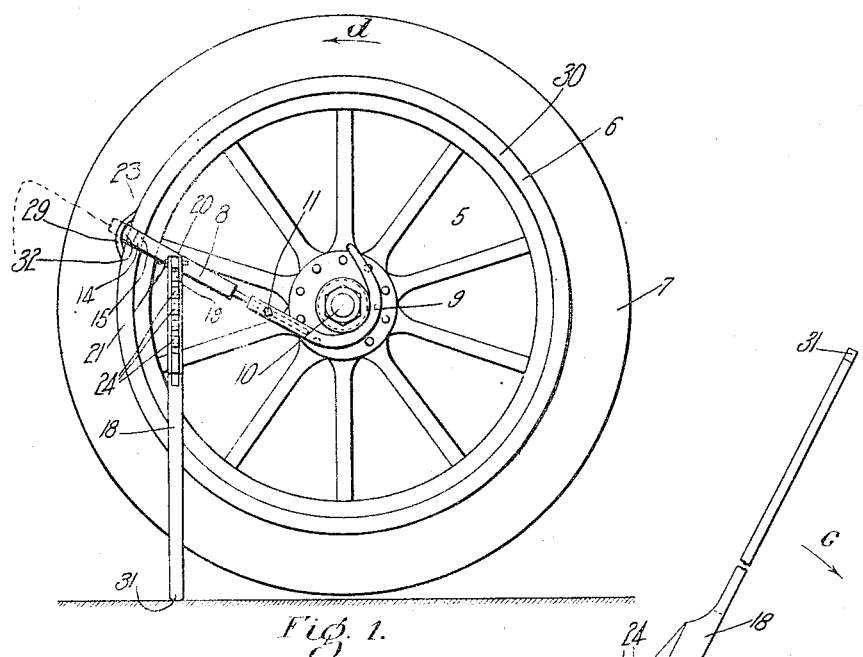
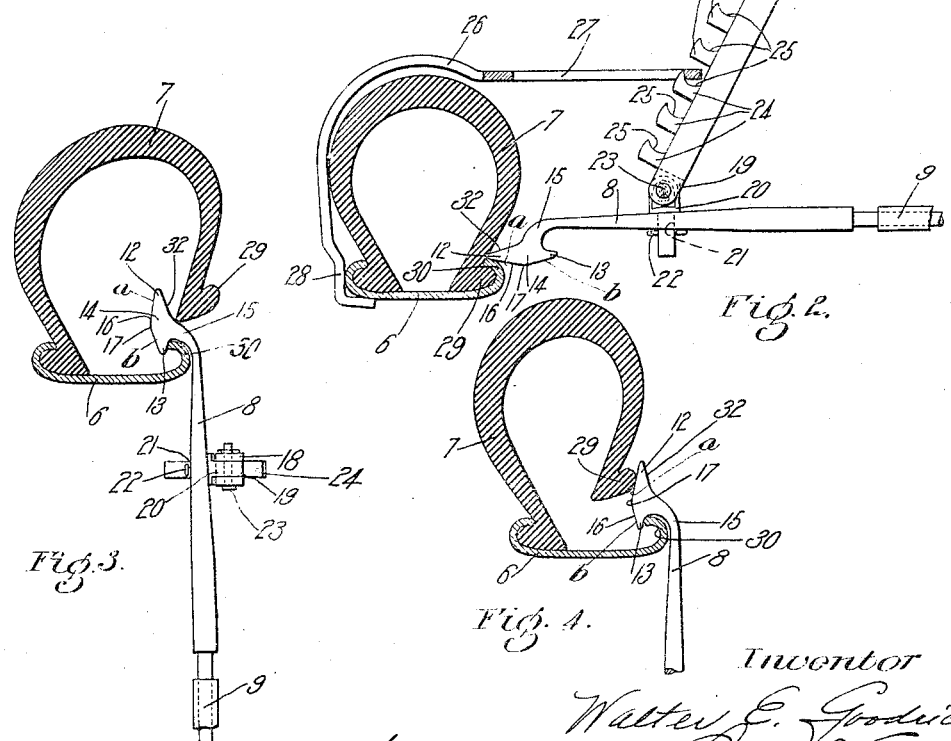

WALTER E. GOODRICH, OF CAMPELLO, MASSACHUSETTS.

TIRE-TOOL.

1,211,571.　　　　Specification of Letters Patent.　　Patented Jan. 9, 1917.

Application filed December 6, 1915. Serial No. 65,177.

*To all whom it may concern:*

Be it known that I, WALTER E. GOODRICH, a citizen of the United States, residing at Campello, in the county of Plymouth and State of Massachusetts, have invented new and useful Improvements in Tire-Tools, of which the following is a specification.

This invention relates to improvements in tire tools, and has for its object to provide a simple and powerful tool adapted to be quickly adjusted to accommodate wheels and tires of different sizes to assist in removing said tire from or replacing the same upon said wheels.

Another object of the invention is to provide means constructed and arranged to start the tire from the rim previous to the insertion of the tire removing instrument beneath the edge thereof, especially when said tire has become stuck to said rim by rust or otherwise.

The invention consists in the combination and arrangement of parts set forth in the following specification and particularly pointed out in the claims.

Referring to the drawings: Figure 1 is a side elevation of a wheel with the tire shown thereon and a tire tool embodying my invention shown in connection therewith. Fig. 2 is a section taken through a tire and rim and illustrating the manner in which the tool is applied to said tire to start the same from the rim previous to its being removed therefrom. Fig. 3 is a section of the tire and rim similar to Fig. 2 illustrating the correct position of the tool when a tire is being removed from the rim. Fig. 4 is a section similar to Figs. 2 and 3 illustrating the correct position for the tire tool during the replacing of a tire upon the rim.

Like numerals refer to like parts throughout the several views of the drawings.

In the drawings 5 is a wheel, 6 a metal rim and 7 a tire shoe, shown attached to the rim. 8 is the bar of the tire removing tool, said bar having means preferably consisting of a hook 9 arranged at one end thereof and adapted to engage the hub 10 of the wheel 5. The hook 9 is preferably adjustably attached at 11 to the bar 8, permitting said hook to be removed longitudinally of said bar to accommodate wheels of various diameters, that is to say, if the wheel is larger than that shown in the drawings, the hook 9 may be moved to the right, referring to Fig. 1, by adjusting the said hook with relation to the bar 8, or if said wheel is smaller than the one illustrated, the hook may be moved to the left of said Fig. 1, so as to maintain the opposite end of the bar 8 in the same relation to the rim of the wheel as is shown in Fig. 1, regardless of the diameter thereof. The opposite end of said bar 8 from that connected with the hook 9 is provided with a tire engaging member 12 and a rim engaging member 13, said members 12 and 13 being arranged at opposite ends of the head 14 of said bar, said head being arranged transversely of an offset or deflected portion 15 of said bar. The outer surface 16 of the head 14 with respect to said bar is inclined downwardly from the extremities of the bar and rim engaging members 12 and 13 respectively, and intersect each other at 17, substantially midway between said extremities, said inclined faces being indicated at $a$ and $b$. A fulcrum lever 18 has preferably universal pivotal connection with the bar 8 so as to coöperate with the tire and rim engaging members to remove or replace the tire. The preferred method of attaching said fulcrum lever to said bar is to fork said lever at 19 to receive a stud 20 which stud has pivotal engagement at 21 with said bar adjacent to the head or working end of said bar. A cotter pin 22 preferably retains the stud 20 in rotatable engagement with said bar. A pin 23 extends through the ears of the forked end 19 and the head of the stud 20 and retains said members in pivotal engagement with one or the other. The fulcrum lever 18 is provided upon its outer surface and adjacent to the pin 23 with a series of lugs 24 spaced at predetermined distances apart and each having a depression 25 in the opposite side thereof with respect to a pin 23.

A hook 26 is provided with a recess 27 adjacent one end thereof through which one or another of the lugs 24 is adapted to be projected while the opposite end of said hook is adapted to extend over or around the tire to the opposite side of the rim 6 (see Fig. 2) and constitutes a fulcrum for the lever 18 when the tire tool is being employed to start the tire from the rim. By moving the said hook from one of the lugs 24 to another said tool may be adjusted to accommodate tires of various diameters and at the same time permit the movement of the head end 14 of said tire tool, relative to the end 28 of said hook which engages the rim, to be varied.

The operation of the device hereinbefore described is as follows: When it is desired to remove a tire from a rim, the wheel bearing said tire is slightly raised from the ground to permit a free movement thereof. The tire engaging member 12 of the tool is then pressed directly against the side of the tire shoe as shown in Fig. 2, and the hook 26 placed against the opposite side of the rim 6 with the recessed end 27 engaging the desired one of the lugs 24 with the lever 18 in the position indicated in said Fig. 2. The outer end of said lever 18 is then pressed downwardly in the direction of the arrow c which causes the end 12 of said tool to force the portion of the tire engaged thereby inwardly away from the rim at that side of said tire. This operation may be continued throughout the entire circumference of the tire if desired, provided the tire has been upon the rim a sufficient length of time to be rusted or frozen to the same. After a sufficient space has been procured between the bead 29 of the tire and the adjacent portions of the rim, the end 12 of the tool of the bar 8 may be inserted beneath said bead and pushed to the position occupied thereby, as illustrated in Fig. 3. The inclined faces a and b assist in inserting the head of said tool beneath the lower edge of the tire after said head has been inserted to the highest point of the incline 17, permitting the rim engaging portion 13 of said head to readily attach itself to the flange 30 of said rim. The hook 9 is then adjusted to engage the hub 10 of the wheel as illustrated in Fig. 1. The lever 18 is swung from the positions occupied thereby during the starting of said tire from the rim into a position substantially at right angles to the bar as shown in Fig. 1 with the extremity 31 of said lever engaging the surface of the ground or floor beneath the wheel. The wheel is then slowly rotated in the direction of the arrow d of Fig. 1, and as said movement continues the inclined portion 32 of the head end of the tool and the deflected portion 15 thereof forces the portion of the rim engaging the same outwardly over the portion 30 of said rim, thus detaching said tire from said rim. To replace the tire upon the rim one bead thereof is first placed in position on the rim after which the rim engaging member 13 is hooked over the flange 30 of the opposite edge of the rim 6 with the inclined face a against the outer portion of the bead 29 of the tire and as said wheel is revolved as hereinbefore stated the head end of said tool will be held stationary by the fulcrum lever 18 and said bead 29 will be gradually worked downwardly over the point 17 of the head 14 until the entire bead is positioned beneath the flange 30.

Having thus described my invention, what I claim and desire by Letters Patent to secure is:

1. A tire tool having, in combination, a bar including a tire engaging portion and a rim engaging portion, means connected with said bar adapted to engage the hub of a wheel, a lever having universal pivotal connection with said bar, and a hook connected with said lever adapted to engage the opposite side of the rim from that engaged by the rim engaging portion of said bar.

2. A tire tool having, in combination, a bar provided with a tire engaging member, a lever pivotally attached to said bar, a series of lugs on said lever and a hook provided with an eye at one end thereof constructed and arranged to receive one of the lugs of said series, the opposite end of said hook being adapted to engage the rim of the tire, said hook constituting a fulcrum for said lever.

3. A tire tool having, in combination, a bar having one end thereof transversely deflected, a head disposed transversely of the end of said deflected portion, one end of said head constituting a tire engaging member and the other end of said head constituting a rim engaging member, the outer surface of said head with respect to said bar being inclined outwardly from opposite extremities thereof to a point substantially midway between said extremities, means adjustably connected with said bar adapted to engage the hub of a wheel and a lever pivotally connected with said bar adjacent to the head end thereof adapted to support said head end during the removing and replacing operations on the tire.

In testimony whereof I have hereunto set my hand in presence of two subscribing witnesses.

WALTER E. GOODRICH.

Witnesses:
 CHARLES S. GOODING,
 SYDNEY E. TAFT.